United States Patent Office 3,814,611
Patented June 4, 1974

3,814,611
BERYLLIUM-CONTAINING HIGH ELASTIC MODULUS GLASSES
William H. Dumbaugh, Jr., 6 E. Chatfield Place, Woodland Park, Painted Post, N.Y. 14870
No Drawing. Continuation-in-part of abandoned application Ser. No. 832,468, June 11, 1969. This application Feb. 9, 1972, Ser. No. 224,984
Int. Cl. C03c 3/04
U.S. Cl. 106—52                     1 Claim

ABSTRACT OF THE DISCLOSURE

This invention relates to transparent glasses exhibiting elastic moduli (Young's moduli) in excess of $17 \times 10^6$ p.s.i. and which demonstrate superior resistance to attack by alkalies. More specifically, this invention relates to transparent glasses in the $BeO-MgO-Al_2O_3-SiO_2$ composition field containing at least one high field strength modifier selected from the group consisting of $La_2O_3$, $TiO_2$, $Y_2O_3$, CaO, $Li_2O$, and $ZrO_2$ which can be made into bulk articles, i.e., articles having a thickness dimension of ¼" or greater, with reasonable ease and which, in the form of fibers, are especially useful in reinforcing concrete or gypsum bodies.

---

This application is a continuation-in-part of my pending application, Ser. No. 832,468, filed June 11, 1969, and now abandoned.

The intensive exploration during the past decade for stronger, harder, and more abrasion resistant materials has stimulated extensive research to discover and commercially produce glasses having very high elastic moduli. Such glasses would have utility in glass fiber reinforced structural materials, laminated high strength materials, and structures for hydrospace applications, to mention but a few uses. It has long been recognized that there is a correlation between elastic modulus and the composition of glasses. Three recent publications reporting systematic investigations of the various factors affecting the elastic modulus in glass are: "The Development of Glass Fibers Having High Young's Moduli of Elasticity," W. Capps and D. H. Blackburn, *National Bureau of Standards Report No. 5188*, Apr. 1, 1957 "Studies in the Composition and Structure of Glasses Possessing High Young's Moduli," K. S. Loewenstein, *Phys. Chem. Glasses*, 2, 69 (1961); and "High-Modulus Glasses Based on Ceramic Oxides," S. D. Brown and G. Y. Onoda, *Bureau of Naval Weapons—Department of the Navy Report R-6692*, October 1966. This last literature reference is of special interest since it reviews in some detail the activities of other researchers in the field of high elastic modulus glasses as well as reporting work undertaken by the authors in developing such glasses from calcium aluminate compositions.

As one result of this extensive research, the following proposition has been repeatedly confirmed: to obtain glass with high elastic modulus, the concentration of network former, e.g., silica, must be kept as low as possible and the concentration of modifiers of high field strength should be maintained as high as possible. Unfortunately, however, this combination of glass components normally yields glasses having very high liquidus values, sharply steep viscosity-temperature curves, and an extremely low viscosity in the melting and forming ranges. These three factors cooperate to make glass forming very difficult, if not impossible, and the quality of the glass often poor. Therefore, the production of glass articles of any substantial bulk which exhibit even reasonable transparency has been difficult with fibers of glass conventionally being the sole commercial product formed.

A second finding resulting from this research, which has also seemingly been confirmed, holds that beryllium oxide is the best modifier for enhancing the elastic modulus of glass. U.S. Pat. No. 3,127,277 is illustrative of glasses in the $CaO-MgO-SiO_2-ZrO_2-TiO_2$ composition field containing BeO which exhibit elastic moduli as high as $16 \times 10^6$ p.s.i.

In the area of fiber reinforcement of concrete and gypsum products, there has been a need for glass fibers displaying improved resistance to alkalies. Hence, glass is intrinsically very strong but the commercially-available glasses frequently demonstrate relatively poor resistance to attack by alkalies and, therefore, this high intrinsic strength deteriorates in the alkaline environment present in concrete and gypsum bodies. The resistance to alkalies demonstrated by several types of commercially-available glasses is recorded below in the table taken from page 131 of the *The Properties of Glass Surfaces*, L. Holland, John Wiley & Sons, Inc., New York, 1964.

| Corning glass code | Glass type | 6 hours, 5% NaOH, 100° C. weight loss (mg./cm.²) |
|---|---|---|
| 7900 | 96% silica | 0.9 |
| 7740 | Borosilicate | 1.4 |
| 0080 | Soda-lime—bulk | 1.1 |
| 0010 | Lead glass—electrical | 1.6 |
| 7050 | Borosilicate—tungsten sealing | 3.9 |
| 8870 | High lead | 3.6 |
| 1710 | Aluminosilicate | 0.35 |
| 7280 | Alkali resistant | 0.09 |

Therefore, the primary objects of this invention are to provide silicate glasses exhibiting transparency even in relatively thick cross section, which will demonstrate elastic moduli in excess of $17 \times 10^6$ p.s.i. and, preferably, greater than $20 \times 10^6$ p.s.i., and which will display excellent resistance to attack by alkalies.

I have now discovered that the above objects can be achieved with glasses consisting essentially, in mole percent on the oxide basis, of about 5–30% BeO, 10–35% MgO, 5–30% $Al_2O_3$, 20–50% $SiO_2$, and 2–30% total of at least one high field strength modifier in the indicated effective proportions selected from the group consisting of 0–10% $La_2O_3$, 0–15% $TiO_2$, 0–15% $Ta_2O_5$, 0–20% $Y_2O_3$, 0–10% CaO, 0–5% $Li_2O$, and 0–15% $ZrO_2$. Where glasses of the highest moduli are desired, i.e., glasses exhibiting elastic moduli of $20 \times 10^6$ p.s.i. and greater, the compositions thereof will normally consist essentially, in mole percent on the oxide basis, of about 5–25% BeO, 10–35% MgO, 5–15% $Al_2O_3$, 30–40% $SiO_2$, and 5–30% total of the high field strength modifiers. The presence of $Y_2O_3$ in the glass composition appears to be especially useful in obtaining glasses demonstrating very high elastic moduli.

Since beryllium oxide and most other beryllium compounds, with the notable exception of beryl ore, are highly toxic, care must be exercised in the steps for manufacturing BeO-containing glasses. For this reason, such glasses have generally been limited to laboratory studies inasmuch as the use of beryl as the sole source of beryllium oxide in the batch severely limits the range of compositions obtainable. Thus, for the highest elastic modulus glass compositions, the silica and/or alumina contents therein are too low and the beryllia content therein too high to permit the use of beryl ore as the sole source of BeO in the batch.

Table I records the compositions, in mole percent on the oxide basis, of several glasses conforming to the requirements of my invention and possessing elastic moduli greater than 17 ×10⁶ p.s.i., along with two glasses wherein the high field strength modifier is absent. The actual batch ingredients may comprise any materials, either the oxides or other compounds, which, on being melted together, are converted to the desired oxide in the proper proportions. Table II designates the specific batch ingredients, in parts by weight, employed in producing the glasses of Table I. The batch ingredients were mixed together but only ballmilled in those instances where beryllium oxide or beryllium carbonate was not present. The batches were melted in an electrically-heated furnace at 1650° C. for four hours in platinum-20% rhodium crucibles. The melts were cast into steel molds to yield slabs about 5″ x 5″ x ½″ and, thereafter, the slabs were transferred to an annealer operating at the proper temperature.

Table I also records an analysis of Owens-Illinois Glass YM-31-A which has been considered in the glass industry to be one of the best high elastic modulus glasses because of the high modulus thereof, coupled with its relatively good liquidus-viscosity relationship for fiber making.

TABLE I

| Percent: | 1 | 2 | 3 | 4 | 5 | 6 |
|---|---|---|---|---|---|---|
| SiO₂ | 34.6 | 30.8 | 46.2 | 47.5 | 34.4 | 34.4 |
| Al₂O₃ | 5.8 | 6.0 | 10.2 | 10.5 | 10.8 | 8.8 |
| MgO | 11.4 | 30.1 | 20.4 | 15.7 | 32.1 | 32.1 |
| BeO | 25.1 | 6.0 | 15.3 | 15.7 | 20.7 | 20.7 |
| La₂O₃ | | | 2.6 | 5.2 | | |
| Ta₂O₅ | 5.8 | | | | | |
| Y₂O₃ | 5.8 | 14.9 | | | | |
| TiO₂ | | 12.0 | | | | |
| ZrO₂ | 11.5 | | | | 2.0 | 2.0 |
| CaO | | 0.2 | 5.1 | 5.2 | | |
| Fe₂O₃ | | | 0.2 | 0.1 | | |
| Li₂O | | | | | | 2.0 |

| | 7 | 8 | 9 | 10 | 11 | 12 |
|---|---|---|---|---|---|---|
| SiO₂ | 45.0 | 35.4 | 33.4 | 35.3 | 57.1 | 33.3 |
| Al₂O₃ | 10.0 | 5.8 | 5.5 | 8.8 | 10.0 | 5.5 |
| MgO | 25.0 | 23.6 | 33.4 | 29.5 | 28.1 | 33.4 |
| BeO | 20.0 | 23.5 | 22.2 | 17.7 | 4.8 | 22.2 |
| La₂O₃ | | | | | | 5.6 |
| Ta₂O₅ | | 5.9 | | | | |
| Y₂O₃ | | 5.8 | 5.5 | 8.7 | | |
| TiO₂ | | | | | | |

| | 13 | 14 | 15 | 16 | 17 | 18 |
|---|---|---|---|---|---|---|
| SiO₂ | 31.6 | 33.3 | 31.6 | 37.8 | 37.8 | 38.9 |
| Al₂O₃ | 5.3 | 5.6 | 5.3 | 2.7 | 2.7 | 2.8 |
| MgO | 31.6 | 33.4 | 31.6 | 32.5 | 32.5 | 27.8 |
| BeO | 21.0 | 22.2 | 21.0 | 21.6 | 21.6 | 22.2 |
| La₂O₃ | | | 5.4 | | | 8.3 |
| Ta₂O₅ | | 5.5 | | | 5.4 | |
| TiO₂ | 10.5 | | | | | |
| ZrO₂ | | | 10.5 | | | |

| | 19 | 20 | 21 | 22 | 23 | 24 |
|---|---|---|---|---|---|---|
| SiO₂ | 33.3 | 30.1 | 36.3 | 34.2 | 28.8 | 45.0 |
| Al₂O₃ | 2.8 | 15.0 | 9.1 | 5.7 | 5.7 | 10.0 |
| MgO | 22.3 | 25.1 | 30.3 | 28.7 | 34.6 | 15.0 |
| BeO | 22.2 | 10.0 | 12.1 | 22.8 | 23.0 | 20.0 |
| La₂O₃ | 5.5 | | | | | |
| Ta₂O₅ | 2.8 | | 12.1 | | | |
| Y₂O₃ | | 19.8 | | 5.7 | 5.7 | |
| TiO₂ | | | | | 2.2 | |
| ZrO₂ | 5.6 | | | | | |
| CaO | | | | | | 10.0 |
| Li₂O | | | | 2.9 | | |
| ZnO | 5.5 | | | | | |

| | 25 | 26 | 27 | 28 | 29 | YM-31-A |
|---|---|---|---|---|---|---|
| SiO₂ | 46.3 | 41.4 | 34.5 | 34.2 | 36.4 | 47.6 |
| Al₂O₃ | 10.3 | 10.4 | 10.7 | 5.7 | 6.1 | |
| MgO | 15.1 | 25.9 | 28.1 | 23.0 | 30.4 | 11.8 |
| BeO | 15.4 | 19.7 | 20.7 | 22.8 | 6.1 | 16.9 |
| La₂O₃ | 2.6 | | | 5.7 | | |
| Ta₂O₅ | | | | 2.9 | | |
| Y₂O₃ | | | | | 15.0 | |
| TiO₂ | | | | | 6.1 | 5.3 |
| ZrO₂ | | | 1.9 | | | |
| CaO | 5.2 | | | | | 12.0 |
| Li₂O | | 2.6 | 4.1 | | | 5.3 |
| CeO₂ | | | | | | 0.9 |
| ZnO | 5.1 | | | 5.7 | | |
| Fe₂O₃ | | | | | | 0.2 |

Table Ia records the compositions of the glasses of Table I in terms of weight percent on the oxide basis.

TABLE Ia

| Percent: | 1 | 2 | 3 | 4 | 5 | 6 |
|---|---|---|---|---|---|---|
| SiO₂ | 23.2 | 22.7 | 44.9 | 40.7 | 39.5 | 40.0 |
| Al₂O₃ | 6.6 | 7.5 | 16.9 | 15.4 | 21.1 | 21.3 |
| MgO | 5.2 | 14.9 | 13.4 | 9.1 | 24.8 | 21.9 |
| BeO | 6.4 | 1.8 | 6.2 | 5.6 | 9.9 | 12.0 |
| La₂O₃ | | | 13.5 | 24.6 | | |
| Ta₂O₅ | 28.4 | | | | | |
| Y₂O₃ | 14.4 | 41.2 | | | | |
| TiO₂ | | 11.8 | | | | |
| ZrO₂ | 15.8 | | | | 4.7 | 4.8 |
| CaO | | 0.1 | 4.7 | 4.2 | | |
| Fe₂O₃ | | | 0.4 | 0.4 | | |

| | 7 | 8 | 9 | 10 | 11 | 12 |
|---|---|---|---|---|---|---|
| SiO₂ | 51.7 | 25.9 | 35.1 | 32.0 | 60.2 | 31.9 |
| Al₂O₃ | 19.5 | 7.3 | 9.9 | 13.6 | 17.9 | 9.0 |
| MgO | 19.3 | 11.7 | 23.6 | 17.9 | 19.8 | 21.5 |
| BeO | 9.5 | 7.2 | 9.7 | 6.7 | 2.1 | 8.8 |
| La₂O₃ | | | | | | 28.8 |
| Ta₂O₅ | | 31.8 | | | | |
| Y₂O₃ | | 16.1 | 21.7 | 29.8 | | |

| | 13 | 14 | 15 | 16 | 17 | 18 |
|---|---|---|---|---|---|---|
| SiO₂ | 37.4 | 28.9 | 34.4 | 37.1 | 33.5 | 33.3 |
| Al₂O₃ | 10.6 | 8.2 | 9.7 | 4.5 | 4.1 | 4.1 |
| MgO | 25.1 | 19.5 | 23.0 | 21.4 | 19.3 | 16.0 |
| BeO | 10.4 | 8.0 | 9.5 | 8.2 | 8.0 | 7.9 |
| La₂O₃ | | | | 28.8 | | 38.7 |
| Ta₂O₅ | | 35.4 | | | 35.1 | |
| TiO₂ | 16.5 | | | | | |
| ZrO₂ | | | 23.4 | | | |

| | 19 | 20 | 21 | 22 | 23 | 24 |
|---|---|---|---|---|---|---|
| SiO₂ | 25.3 | 29.8 | 21.9 | 35.9 | 30.1 | 50.2 |
| Al₂O₃ | 3.6 | 12.6 | 9.3 | 10.2 | 10.2 | 18.9 |
| MgO | 11.4 | 16.6 | 12.2 | 20.2 | 24.3 | 11.2 |
| BeO | 7.0 | 4.1 | 3.0 | 10.0 | 10.0 | 9.3 |
| La₂O₃ | 22.9 | | | | | |
| Ta₂O₅ | 15.5 | | 53.6 | | | |
| Y₂O₃ | | 36.9 | | 22.3 | 22.4 | |
| TiO₂ | | | | | 3.0 | |
| ZrO₂ | 8.6 | | | | | |
| ZnO | 5.7 | | | | | |
| CaO | | | | | | 10.4 |
| Li₂O | | | | 1.5 | | |

| | 25 | 26 | 27 | 28 | 29 | YM-31-A |
|---|---|---|---|---|---|---|
| SiO₂ | 43.6 | 48.2 | 39.9 | 26.7 | 72.1 | 53.7 |
| Al₂O₃ | 16.5 | 20.5 | 21.2 | 7.5 | 7.7 | |
| MgO | 9.6 | 20.2 | 21.8 | 12.0 | 15.2 | 9.0 |
| BeO | 6.0 | 9.6 | 10.0 | 7.4 | 1.9 | 8.0 |
| La₂O₃ | 13.1 | | | 24.1 | | |
| Ta₂O₅ | | | | 16.3 | | |
| Y₂O₃ | | | | | 42.1 | |
| TiO₂ | | | | 6.0 | | |
| ZrO₂ | | | 4.8 | | | 8.0 |
| ZnO | 6.6 | | | 6.0 | | 2.0 |
| CaO | 4.6 | | | | | 12.7 |
| Li₂O | | 1.5 | 2.3 | | | 3.0 |
| CeO₂ | | | | | | 3.0 |
| Fe₂O₃ | | | | | | 0.6 |

TABLE II

| | 1 | 2 | 3 | 4 | 5 | 6 |
|---|---|---|---|---|---|---|
| Dry sand | 2.0 | 80.3 | 203.3 | 184.2 | 111.7 | 191.4 |
| Calcined Al₂O₃ | | 29.0 | | | 63.2 | 85.3 |
| Alumina hydrate | | | 181.9 | 164.4 | | |
| MgO | 31.1 | 90.7 | 200.1 | 135.8 | 75.7 | 127.4 |
| Beryl ore | 211.9 | 86.7 | 732.5 | 664.5 | | |
| BeO | 11.4 | | | | | 50.9 |
| La₂O₃ | | | 203.7 | 369.5 | | |
| Ta₂O₅ | 170.3 | | | | | |
| Y₂O₃ | 87.0 | 250.3 | | | | |
| TiO₂ | | 71.3 | | | | |
| ZrO₂ | 95.0 | | | | | |
| CaCO₃ | | | 125.6 | 114.0 | | |
| Li₂CO₃ | | | | | | 14.6 |
| BeCO₃ | | | | | 82.6 | |
| Zircon | | | | | 21.1 | 36.2 |

| | 7 | 8 | 9 | 10 | 11 | 12 |
|---|---|---|---|---|---|---|
| Dry sand | 51.6 | 2.7 | 3.6 | | 180.5 | 3.5 |
| Calcined Al₂O₃ | | | | 26.3 | 53.6 | |
| Alumina hydrate | 128.9 | | | | | |
| MgO | 286.7 | 69.5 | 140.9 | 108.4 | 59.6 | 128.4 |
| Beryl ore | 1,120.4 | 236.5 | 319.4 | 296.2 | | 290.9 |
| BeO | | 12.9 | 17.4 | 2.0 | 6.3 | 15.8 |
| La₂O₃ | | | | | | 173.0 |
| Ta₂O₅ | | 190.6 | | | | |
| Y₂O₃ | | 97.4 | 131.5 | 180.1 | | |

| | 13 | 14 | 15 | 16 | 17 | 18 |
|---|---|---|---|---|---|---|
| Dry sand | 5.1 | 3.1 | 4.8 | 129.1 | 117.0 | 116.4 |
| MgO | 152.5 | 116.5 | 139.9 | 127.4 | 115.6 | 95.8 |
| Beryl ore | 338.7 | 263.0 | 310.6 | 144.2 | 131.0 | 130.3 |
| BeO | 18.9 | 14.4 | 17.3 | 34.2 | 31.1 | 30.9 |
| La₂O₃ | | | | 171.6 | | 232.4 |
| Ta₂O₅ | | 212.8 | | | 211.2 | |
| TiO₂ | 100.1 | | | | | |
| ZrO₂ | | | 140.7 | | | |

TABLE II—Continued

|  | 19 | 20 | 21 | 22 | 23 | 24 |
|---|---|---|---|---|---|---|
| Dry sand | 51.8 | 53.3 | 39.4 | 4.6 |  | 50.1 |
| Calcined Al₂O₃ |  | 39.8 | 29.4 |  | 9.1 |  |
| Alumina hydrate |  |  |  |  |  | 124.9 |
| MgO | 67.9 | 100.8 | 74.3 | 122.5 | 147.7 | 166.1 |
| Beryl ore | 113.9 | 192.7 | 142.0 | 325.5 | 278.3 | 1,087.5 |
| BeO | 27.5 |  |  | 18.1 | 24.4 |  |
| La₂O₃ | 137.3 |  |  |  |  |  |
| Ta₂O₅ | 93.1 |  | 321.6 |  |  |  |
| Y₂O₃ |  | 222.7 |  | 134.8 | 135.5 |  |
| TiO₂ |  |  |  |  | 18.1 |  |
| ZrO₂ |  |  |  |  |  |  |
| CaCO₃ |  |  |  |  |  | 279.9 |
| Li₂CO₃ |  |  |  | 22.1 |  |  |
| Zircon | 79.3 |  |  |  |  |  |
| ZnO | 34.3 |  |  |  |  |  |

|  | 25 | 26 | 27 | 28 | 29 |
|---|---|---|---|---|---|
| Dry sand | 196.8 |  | 187.7 | 2.9 | 105.5 |
| Calcined Al₂O₃ |  |  | 106.2 |  | 29.5 |
| Alumina hydrate | 175.5 | 150.8 |  |  |  |
| MgO | 144.8 | 299.7 | 109.3 | 71.6 | 92.1 |
| Beryl ore | 707.9 | 1,114.8 |  | 243.2 | 88.1 |
| BeO |  |  | 49.9 | 13.3 |  |
| La₂O₃ | 196.8 |  |  | 144.6 |  |
| Ta₂O₅ |  |  |  | 98.0 |  |
| Y₂O₃ |  |  |  | 254.0 |  |
| TiO₂ |  |  |  | 36.2 |  |
| ZrO₂ |  |  |  |  |  |
| CaCO₃ |  | 121.2 |  |  |  |
| Li₂CO₃ |  |  | 55.4 | 28.6 |  |
| Zircon |  |  | 35.4 |  |  |
| ZnO |  | 98.3 |  | 36.1 |  |

Table III reports various physical properties secured on the Examples set out in Tables I and II. The values obtained other than the chemical durability data, were determined in accordance with measuring techniques conventional in glass technology. The elastic moduli of Examples 1–29 were measured on bar samples in accordance with ASTM Designation: C 623–71. (The elastic modulus of YM–31–A glass was measured on a fiber.) The chemical durability figures represent weight loss in milligrams/cm.² resulting from contacting the glass with a 5% aqueous solution of NaOH for 6 hours at 95° C.

The ratio of elastic modulus to density recorded therein is analogous to the familiar strength-to-weight relationship of construction materials. Thus, in the main, the higher this ratio the more desirable is the product. Inasmuch as the atomic weight of beryllium is very low, when compared with those of the recited high field strength modifiers, the use of BeO to improve the elastic modulus of a glass allows the achievement of higher modulus-to-density ratios than can be attained in those glasses where the improvement in elastic modulus is accomplished solely with other high field strength modifiers.

The above-defined glass composition ranges must be straitly observed to secure transparent glasses possessing excellent resistance to alkali attack and elastic moduli in excess of $17 \times 10^6$ p.s.i. Thus, where quantities of $SiO_2$ less than about 20 mole percent are utilized, the glasses become extremely difficult to form in good quality and where amounts greater than about 50 mole percent are attempted, the elastic modulus slips below $17 \times 10^6$ p.s.i. and, also, alkali durability deteriorates. Further, where $Al_2O_3$ is present in quantities less than about 5 mole percent, the viscosity of the glass at the liquidus becomes too low for forming bulk bodies whereas with amounts more than about 30 mole percent, the liquidus temperature becomes too high for conventional melting techniques. Also, at MgO contents less than about 10 mole percent, the elastic modulus will be less than $17 \times 10^6$ p.s.i. and at contents greater than about 35 mole percent the liquidus temperature becomes too high for normal melting practice. Still further, at least about 5% BeO must be present to insure a greatly enhanced elastic modulus but amounts more than about 30 mole percent raise the liquidus temperatures too high for practical melting practice. And, finally, at least about 2 mole percent of the high field strength modifiers must be included to enhance the elastic modulus of the glass while insuring good alkali resistance and transparency in the glass.

TABLE III

|  | 1 | 2 | 3 | 4 | 5 | 6 | 7 |
|---|---|---|---|---|---|---|---|
| Liquidus, ° C | 1,458 | 1,433 | 1,180 | 1,146 | 1,373 | 1,358 | 1,330 |
| Viscosity at liquidus, poises | 50 | 50 | 550 | 1,300 | 14 | 30 | 65 |
| Annealing point, ° C | 775 | 770 | 737 | 747 | 753 |  | 744 |
| Strain point, ° C | 733 | 730 | 698 | 707 | 720 |  | 704 |
| Expansion coefficient (0°–300° C.)×10⁻⁷ ° C | 55.3 | 75.2 | 53.6 | 57.7 | 54.2 | 59.2 | 48.5 |
| Density, g./cc | 4.136 | 3.83 | 2.989 | 3.255 |  |  | 2.731 |
| Poisson's ratio | 0.28 | 0.30 | 0.29 | 0.29 | 0.26 | 0.26 | 0.26 |
| Elastic modulus (×10⁶) | 22.1 | 21.0 | 17.4 | 17.5 | 19.7 | 20.2 | 18.5 |
| Chemical durability (mg./cm.²) |  | 0.14 | 0.18 | 0.06 |  | 0.65 | 0.73 |
| Elastic modulus/density (×10⁶) | 5.34 | 5.48 | 5.82 | 5.37 |  |  | 6.77 |

|  | 8 | 9 | 10 | 11 | 12 | 13 | 14 |
|---|---|---|---|---|---|---|---|
| Liquidus, ° C | 1,401 | 1,410 | 1,420 |  | 1,371 | 1,373 | 1,363 |
| Viscosity at liquidus, poises |  |  |  |  |  |  |  |
| Annealing point, ° C | 753 | 743 | 755 | 770 | 740 | 723 | 727 |
| Strain point, ° C | 713 | 704 | 716 | 728 | 700 | 687 | 690 |
| Expansion coefficient (0°–300° C.)×10⁻⁷ ° C | 59.7 | 67.0 | 66.4 | 37.9 | 71.2 | 64.0 | 59.7 |
| Density, g/cc | 3.932 | 3.224 | 3.360 | 2.616 | 3.460 | 3.001 | 3.681 |
| Poisson's ratio | 0.27 | 0.28 | 0.29 | 0.27 | 0.286 | 0.28 | 0.277 |
| Elastic modulus (×10⁶) | 21.6 | 20.9 | 20.8 | 15.2 | 20.08 | 21.95 | 20.91 |
| Chemical durability (mg./cm.²) | 0.04 | 0.21 | 0.05 | 1.3 |  |  |  |
| Elastic modulus/density (×10⁶) | 5.49 | 6.47 | 6.19 | 5.61 | 5.80 | 7.31 | 5.68 |

|  | 15 | 16 | 17 | 18 | 19 | 20 | 21 | 22 |
|---|---|---|---|---|---|---|---|---|
| Liquidus, ° C | 1,413 | 1,397 | 1,339 | 1,375 | 1,365 | 1,433 | 1,453 | 1,410 |
| Annealing point, ° C | 736 | 745 | 732 | 756 | 734 | 765 | 730 | 697 |
| Strain point, ° C | 699 | 708 | 693 | 718 | 697 | 726 | 690 | 658 |
| Expansion coefficient (0°–300° C.)×10⁻⁷ ° C | 60.9 | 68.3 | 55.0 | 68.9 | 65.2 | 69.1 | 47.1 | 70.0 |
| Density, g./cc | 3.012 | 3.405 | 3.602 | 4.079 | 3.514 | 4.307 | 3.201 |  |
| Poisson's ratio | 0.25 | 0.291 | 0.275 | 0.288 | 0.271 | 0.30 | 0.28 | 0.28 |
| Elastic modulus (×10⁶) | 21.36 | 20.18 | 20.50 | 19.87 | 20.68 | 20.7 | 20.2 | 21.52 |
| Elastic modulus/density (×10⁶) | 7.09 | 5.93 | 5.69 | 5.40 | 5.07 | 5.89 | 4.69 | 6.72 |

|  | 23 | 24 | 25 | 26 | 27 | 28 | 29 | YM–31–A |
|---|---|---|---|---|---|---|---|---|
| Liquidus, ° C | 1,400 | 1,392 | 1,157 | 1,356 | 1,354 | 1,311 | 1,356 | 1,127 |
| Viscosity at liquidus, poises |  |  | 600 | 24 | 24 |  |  | 130 |
| Annealing point, ° C | 737 | 733 | 728 | 691 |  | 728 | 774 | 638 |
| Strain point, ° C | 699 | 700 | 695 | 655 |  | 696 | 736 | 605 |
| Expansion coefficient (0°–300° C.)×10⁻⁷ ° C | 71.3 | 53.0 | 53.9 | 53.6 | 50.1 | 63.8 | 73.1 | 69.6 |
| Density, g./cc | 3.293 | 2.747 | 3.083 | 2.754 |  | 3.932 | 3.750 | 2.885 |
| Poisson's ratio | 0.29 | 0.28 | 0.28 | 0.27 | 0.28 | 0.290 | 0.29 | 0.17 |
| Elastic modulus (×10⁶) | 22.03 | 17.2 | 17.38 | 18.6 | 19.95 | 20.38 | 20.8 | 16.1 |
| Chemical durability (mg./cm.²) |  |  |  |  |  |  |  | 0.16 |
| Elastic modulus/density (×10⁶) | 6.69 | 6.26 | 5.64 | 6.78 |  | 5.18 | 5.55 | 5.58 |

The essential transparency of these articles can be appreciated by the fact that the transmission of visible radiation through ¼" thick ground and polished sheets will not fall below about 75%.

The avoidance of components exclusive of the indicated effective proportions of BeO, MgO, $Al_2O_3$, $SiO_2$, and high field strength modifiers is preferable although minor amounts, totalling less than about 10 mole percent, of various compatible metal oxides can be tolerated. The inclusion of ZnO and the alkaline earth metal oxides SrO and BaO may, in some circumstances, be helpful in tailoring physical properties, such as improving alkali durability, for a special application without seriously reducing the elastic modulus. Hence, the glass can be softened and the forming viscosity thereof improved through additions of miscellaneous metal oxides. However, the inclusion of such glass formers as $B_2O_3$ and $P_2O_5$ along with such strong fluxes as $Na_2O$, $K_2O$, and fluoride should be eschewed since such materials can have a decidedly deleterious effect on the elastic modulus and/or the alkali durability of the glass. Therefore, additions thereof should be sparingly utilized, if at all, and certainly not more than a total of about 5%. Therefore, in general, the use of any extraneous metal oxide hazards the stability of the glass as well as the elastic modulus thereof so caution must be employed in this practice.

A correlation of Table I with Table III clearly confirms the glass composition parameters necessary to the invention. From the point of view of elastic modulus, Examples 1, 2, 6, 8–10, 12–17, 19–23, 28, and 29 illustrate the preferred glass compositions, viz., glasses demonstrating moduli in excess of $20 \times 10^6$ p.s.i. The $22.1 \times 10^6$ p.s.i. measurement of elastic modulus recorded for Example 1 is believed to be the highest ever determined for any glass. The $21.0 \times 10^6$ p.s.i. value of elastic modulus reported for Example 2 is believed to be the highest ever measured for a glass made from a batch essentially free from toxic ingredients.

The improvement in resistance to attack by alkalies which the additions of high field strength modifiers impart to the base glass is quite apparent when Examples 7 and 11 are compared with other compositions. Thus, such glasses as Examples 4, 8, and 10 exhibit a chemical durability in excess of Corning Code 7280, a commercially-available glass specifically designed for laboratory glassware to resist attack by alkalies. This latter glass demonstrates an average weight loss of 0.09 mg./cm.² when exposed to a 5% aqueous solution of NaOH for 6 hours at 100° C.

Examples 3, 4, and 25 are illustrative of a further factor of this invention. Thus, the inclusion of a combination of $La_2O_3$ and CaO in the base glass composition will yield glasses having lower liquidus temperatures and higher viscosities at the liquidus than other BeO-containing silicate glasses exhibiting elastic moduli greater than $17 \times 10^6$ p.s.i. Hence, glasses containing at least 2% $La_2O_3$ and 2% CaO, though sometimes not demonstrating the highest elastic moduli, can be melted in commercial mass production melting units and formed into transparent bulk bodies utilizing techniques conventional in glass technology which are presently available for handling glasses with liquidus temperatures under 1250° C. and with viscosities at the liquidus of at least 500 poises. It can be further observed that Example 3 and, especially, Example 4 exhibit excellent resistance to alkali attack.

Therefore, in summary, this invention provides bulk articles of transparent glasses with high resistance to alkali attack and having elastic moduli in excess of $17 \times 10^6$ p.s.i. and which can exceed $20 \times 10^6$ p.s.i., such as to impart very high elastic modulus-to-density ratios to the articles. Further, glasses having elastic moduli approaching $18 \times 10^6$ p.s.i. can be made from $La_2O_3$ and CaO-containing compositions which exhibit commercially practical melting and forming characteristics. Finally, glasses exhibiting elastic moduli between about $17-20 \times 10^6$ p.s.i. can be made from BeO-containing compositions wherein beryl ore, which is non-toxic, is employed as the sole source of BeO.

United States Application Ser. No. 832,467, filed by me of even date with Ser. No. 832,468, and assigned to the same assignee as the instant application, discloses a modification of the present invention wherein glasses having similar base glass compositions, but being essentially free from BeO, can be produced possessing elastic moduli which may exceed $20 \times 10^6$ p.s.i. Such glasses, while not exhibiting elastic moduli values as high as those of the instant invention, have the advantageous quality of being free from the hazardous toxicity of BeO. Ser. No. 832,467, now abandoned, was re-filed as Ser. No. 273,435 on July 20, 1972.

I claim:

1. A transparent glass exhibiting excellent resistance to attack by alkalies, demonstrating an elastic modulus in excess of $17 \times 10^6$ p.s.i., having a liquidus temperature less than 1250° C., and a viscosity at the liquidus of at least 500 poises consisting essentially, in mole percent on the oxide basis, of about 5–30% BeO, 10–35% MgO, 5–30% $Al_2O_3$, 20–50% $SiO_2$, 2–10% $La_2O_3$, and 2–10% CaO, said glass being substantially free from $B_2O_3$, $P_2O_5$, $Na_2O$, $K_2O$, and F.

References Cited

UNITED STATES PATENTS

| | | | |
|---|---|---|---|
| 3,127,277 | 3/1964 | Tiene | 106—50 |
| 3,573,078 | 3/1971 | Bacon | 106—52 |
| 3,060,041 | 10/1962 | Loewenstein | 106—50 |
| 3,483,072 | 12/1969 | Cox et al. | 106—50 UX |
| 3,620,787 | 11/1971 | McMarlin | 106—50 |
| 2,978,341 | 4/1961 | Bastian et al. | 106—50 |
| 3,044,888 | 7/1962 | Provance | 106—50 |
| 3,805,166 | 9/1957 | Löffler | 106—52 |

FOREIGN PATENTS

| | | | |
|---|---|---|---|
| 218,012 | 1942 | Switzerland | 106—50 |

OTHER REFERENCES

Volf: Technical Glasses (1961), pp. 68, 142–143, 410–411, 434.

Williams et al.: Glass Technology vol. 11, No. 3, June 1970, "Young's Modulus of Alkali-Free Glass," pp. 76–79.

HELEN M. McCARTHY, Primary Examiner

U.S. Cl. X.R.

106—50, 99, 109

UNITED STATES PATENT OFFICE
CERTIFICATE OF CORRECTION

Patent No. 3,814,611                 Dated June 4, 1974

Inventor(s) William H. Dumbaugh, Jr.

It is certified that error appears in the above-identified patent and that said Letters Patent are hereby corrected as shown below:

Column 1, line 6, insert "assignor to Corning Glass Works, Corning, N.Y.".

Column 3, Table I, Example 4, constituent $Fe_2O_3$, "0.1" should be -- 0.2 --.

Column 4, Table Ia, Example 29, constituent $SiO_2$, "72.1" should be -- 27.1 --.

Column 6, line 32, "temperatures" should be -- temperature --.

Signed and Sealed this thirtieth Day of March 1976

[SEAL]

Attest:

RUTH C. MASON
*Attesting Officer*

C. MARSHALL DANN
*Commissioner of Patents and Trademarks*